No. 667,047. Patented Jan. 29, 1901.
C. WELLER & C. F. RUPP.
NEST.
(Application filed Feb. 28, 1900.)
(No Model.)
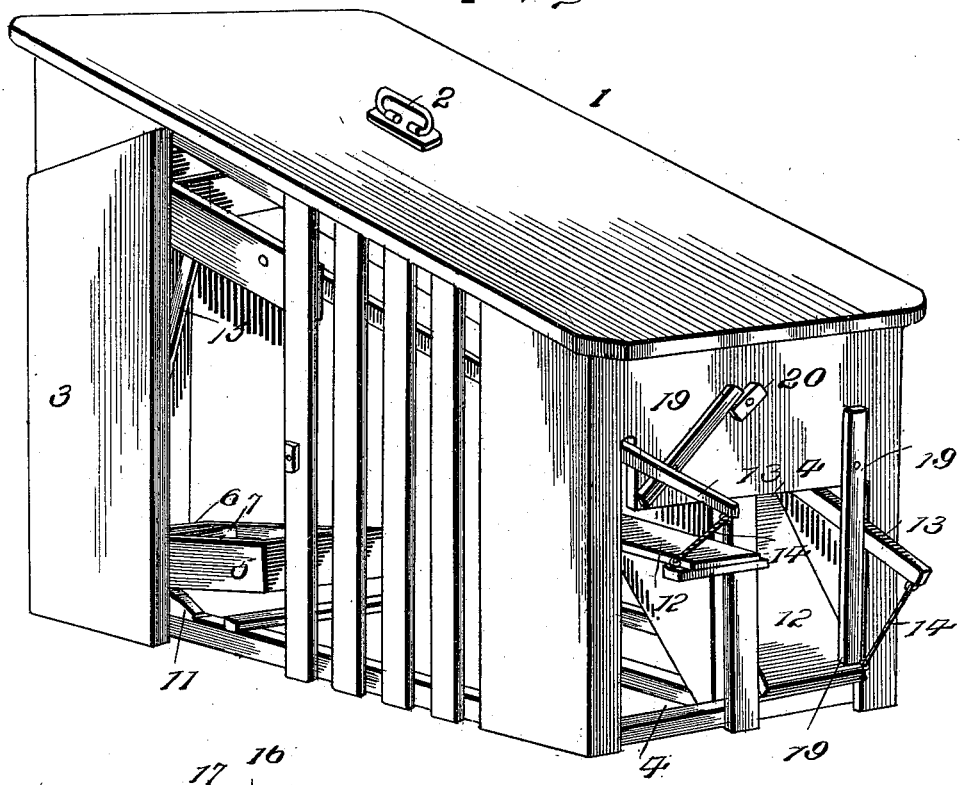
Fig. 1.
Fig. 2.
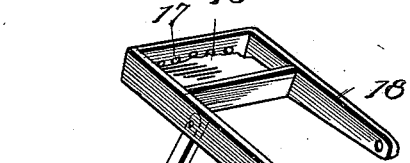
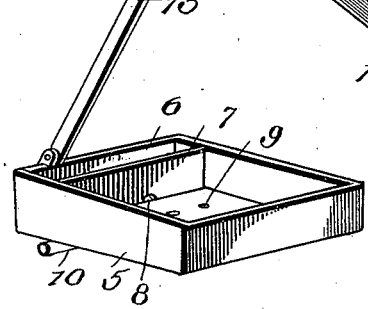
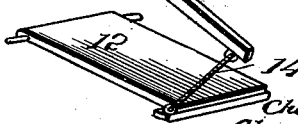
Witnesses
Inventors
Charles Weller
Charles F. Rupp
by Lacey Their Attorneys

UNITED STATES PATENT OFFICE.

CHARLES WELLER AND CHARLES F. RUPP, OF MOUNT PULASKI, ILLINOIS.

NEST.

SPECIFICATION forming part of Letters Patent No. 667,047, dated January 29, 1901.

Application filed February 28, 1900. Serial No. 6,857. (No model.)

*To all whom it may concern:*

Be it known that we, CHARLES WELLER and CHARLES F. RUPP, citizens of the United States, residing at Mount Pulaski, in the county of Logan and State of Illinois, have invented certain new and useful Improvements in Nests; and we do hereby declare the following to be a full, clear, and exact description of the invention, such as will enable others skilled in the art to which it appertains to make and use the same.

This invention has relation to nests for use in hatching poultry, and aims to prevent the drying out of the eggs during the incubating period by providing means for supplying moisture.

For a full description of the invention and the merits thereof, and also to acquire a knowledge of the details of construction of the means for effecting the result, reference is to be had to the following description and the drawings hereto attached.

While the essential and characteristic features of the invention are necessarily susceptible of modification, still the preferred embodiment of the invention is illustrated in the accompanying drawings, in which—

Figure 1 is a perspective view of a device specially designed for attaining the objects of the invention. Fig. 2 is a perspective view of a nest and the parts coöperating therewith.

Corresponding and like parts are referred to in the following description and indicated in both views of the drawings by the same reference characters.

The frame or housing for inclosing the nest and adjunctive parts may be of any design, and as shown the sides are partly slatted for the purpose of admitting light and ventilation. The top 1 slopes upwardly from front to rear and is tight, so as to exclude rain and direct sunshine. A handle 2 is applied to the top for convenience in carrying the device when moving it from one place to another. Access is had to the interior of the frame or housing by means of a door 3, which is located adjacent to the nest to facilitate access thereto. The exact position of the door is not important. The hen has free ingress and egress from the structure by means of an opening 4, provided in the front side thereof, and in the event of more than one nest being provided the housing will be subdivided into compartments, and each compartment will have a door-opening 4, a nest, and parts coöperating therewith.

The nest 5 is in the form of a box and is pivotally supported by means of a cross-bar 10 and bearings 11, and it has at one end, preferably the rear, a compartment 6, formed by a partition 7, having an opening 8 in its lower edge to establish communication between the said compartment and nest. In this compartment 6 water is placed to feed gradually through the opening 8 into the nest to moisten the straw contained therein whenever needed. In hatching eggs it is essential that a proper amount of air-space exist in the egg at all times, but more especially from the sixth to the twelfth days of the incubating period, and the formation of this air-space is dependent upon and effected by the amount of moisture supplied to the eggs. Moisture is naturally supplied to the eggs from the body of the hen while setting; but if a sufficient amount of moisture is not given or the hen leaves the nest frequently the eggs dry out and hatch slowly, or a full hatch is not secured. Our construction of nest-box avoids all uncertainty, and by its use a proper amount of moisture is supplied to the eggs at all times. Openings or perforations 9 are formed in the bottom of the nest to allow the surplus water to escape.

A bar 13 is located in the upper portion of the frame and extends lengthwise thereof and is pivoted thereto near its end and has its front end projecting beyond the front side of the frame and connected by a link 14 with the free end of the door 12. A rod 15 connects the rear end of the nest 5 with the rear end of the pivoted bar 13 and causes the two to move in unison. A box 16 is applied to the rear end of the pivoted bar 13 and is adapted to receive one or more counterbalancing-weights 17, by means of which the door 12 is held open when the device is set to receive the hen. An arm 18 is secured to the box 16 and extends about parallel with the bar 13 and is pivoted to the frame in transverse alinement with the pivotal connection therewith of the bar 13.

A lock is combined with the device and in its simplest form consists of a bar 19, pivoted at its upper end to the front of the structure above the door-opening 4. This bar is set to rest loosely upon the door 12 when open, and when said door closes the bar will swing downward and assume a vertical position, as shown at the right-hand side of Fig. 1, and hold said door against upward movement until turned aside by design. When the nest is set for pedigree or for keeping tally, the pivoted bar 19 rests upon the door, and when the hen passes into the structure and perches upon the nest the latter tilts and the door 12 closes in the manner stated, and the bar 19, assuming a vertical position, with its lower end resting upon the door, holds the latter closed, and the services of an attendant are required to liberate the hen. Hence it is readily known which hen of a brood lays the egg found in the nest. When the nest is used in the ordinary manner, the lock or pivoted bar 19 is turned aside and held from operation by means of a catch or turn-button 20, as shown at the left-hand side of Fig. 1.

When the hen is hatching, she is kept isolated by securing the door 12 when closed, and when it is required to moisten the straw or other material placed in the nest water is poured into the compartment 6 and passes from thence into the nest through the opening 8 in the partition 7, the surplus water escaping through the perforations 9 in the manner hereinbefore stated.

Having thus described the invention, what is claimed as new is—

A nest having a perforate bottom and provided with a compartment at one end having communication with the nest proper by means of an opening in the lower edge of the separating-partition, substantially as set forth.

In testimony whereof we affix our signatures in presence of two witnesses.

CHARLES WELLER. [L. S.]
CHARLES F. RUPP. [L. S.]

Witnesses:
GEO. RUPP,
ROBERT AITCHISON.